(12) United States Patent
Cowley et al.

(10) Patent No.: US 7,682,484 B2
(45) Date of Patent: Mar. 23, 2010

(54) APPARATUS AND METHOD FOR REMOVING VOLATILE COMPONENTS FROM VISCOUS LIQUIDS

(75) Inventors: Peter R. Cowley, Lunenburg, MA (US); Randolph E. Newman, Belchertown, MA (US)

(73) Assignee: Process Development Services, Inc., Lunenburg, MA (US)

( * ) Notice: Subject to any disclaimer, the term of this patent is extended or adjusted under 35 U.S.C. 154(b) by 967 days.

(21) Appl. No.: 11/394,565

(22) Filed: Mar. 31, 2006

(65) Prior Publication Data
US 2006/0169416 A1 Aug. 3, 2006

Related U.S. Application Data

(63) Continuation-in-part of application No. 10/320,976, filed on Dec. 17, 2002, now abandoned.

(60) Provisional application No. 60/342,665, filed on Dec. 20, 2001.

(51) Int. Cl.
*B01D 1/16* (2006.01)
*C08F 6/10* (2006.01)
*C08F 6/28* (2006.01)

(52) U.S. Cl. .............. 159/2.1; 159/2.3; 159/3; 159/18; 159/27.1; 159/28.2; 159/43.1; 159/48.1; 159/901; 159/DIG. 10; 159/DIG. 16; 239/550; 239/554; 528/501; 528/502 E

(58) Field of Classification Search .......... 159/2.1, 159/2.3, 3, 18, 27.1, 28.2, 43.1, 48.1, 901, 159/DIG. 10, DIG. 16, DIG. 42; 239/550, 239/554; 528/501, 502 E
See application file for complete search history.

(56) References Cited

U.S. PATENT DOCUMENTS

| 2,893,926 | A | | 7/1959 | Worthen et al. |
| 3,080,354 | A | | 3/1963 | Moon |
| 3,311,676 | A | | 3/1967 | Toekes |
| 3,625,273 | A | * | 12/1971 | Buschor ............ 159/6.2 |
| 3,853,672 | A | | 12/1974 | Gordon et al. |
| 3,886,049 | A | | 5/1975 | Bir et al. |
| 3,928,300 | A | | 12/1975 | Hagberg |

(Continued)

FOREIGN PATENT DOCUMENTS

GB 1269936 4/1972

(Continued)

*Primary Examiner*—Virginia Manoharan
(74) *Attorney, Agent, or Firm*—McCormick, Paulding & Huber LLP

(57) ABSTRACT

A devolatilizer apparatus and method for devolatilization of viscous polymer liquids yields polymer products with very low levels of residual volatile components. A stream of liquid polymer is dropped through a first vacuum chamber, thereby removing a portion of the volatile components. The stream is collected at the bottom of the first chamber, and is re-circulated to a manifold and liquid distributor assembly in a second chamber in the same vessel. The stream flows by gravity through the second chamber, which is maintained at a higher level of vacuum than the first chamber. Improved devolatilization is accomplished by exposing the polymer liquid to multiple stages of vacuum in a single vessel. The first chamber may be located generally above the second chamber, but in the same vessel, with the stream falling through the second chamber a first time before re-circulation to the manifold.

4 Claims, 2 Drawing Sheets

U.S. PATENT DOCUMENTS

| | | |
|---|---|---|
| 3,966,538 A | 6/1976 | Hagberg |
| 4,294,652 A | 10/1981 | Newman |
| 4,439,601 A | 3/1984 | McCurdy et al. |
| 4,537,954 A | 8/1985 | Ando et al. |
| 4,934,433 A | 6/1990 | Aboul-Nasr |
| 5,024,728 A | 6/1991 | Morita et al. |
| 5,069,750 A | 12/1991 | Aboul-Nasr |
| 5,118,388 A | 6/1992 | Aboul-Nasr |
| 5,540,813 A | 7/1996 | Sosa et al. |
| 5,874,525 A | 2/1999 | Krupinski et al. |
| 6,211,331 B1 | 4/2001 | Craig |
| 6,685,802 B1 | 2/2004 | Nazzer |

FOREIGN PATENT DOCUMENTS

| | | |
|---|---|---|
| WO | WO 01/39856 A1 | 6/2001 |
| WO | WO 01/77188 A1 | 10/2001 |

* cited by examiner

APPARATUS AND METHOD FOR REMOVING VOLATILE COMPONENTS FROM VISCOUS LIQUIDS

CROSS-REFERENCE TO RELATED APPLICATIONS

This application is a continuation-in-part of U.S. application Ser. No. 10/320,976 filed Dec. 17, 2002, abandoned, which claims the benefit under 35 U.S.C. §119(e) of prior U.S. Provisional Application Ser. No. 60/342,665 filed Dec. 20, 2001, both of which are hereby incorporated by reference in their entireties.

BACKGROUND OF THE INVENTION

In the manufacture of monovinyl polymers such as styrene homopolymer, elastomer modified styrene homopolymer, styrene copolymers with acrylonitrile, methacrylic acid esters, and maleic acid derivatives, both with and without elastomeric modification and acrylic polymers, by a continuous polymerization method, it is necessary to remove a fraction of volatile components such as un-reacted monomers, solvents, and impurities from a viscous polymer liquid composed of these volatile components and the polymer product. To accomplish such removal, producers of the named polymers widely practice a step in the manufacturing process known in the industry as devolatilization.

Devolatilization is required for polymer products entering the general consumer market in order to eliminate odors from the small quantities of volatile components that remain in the polymer after production, and to meet the technical requirements of polymers that are used for food-contact applications.

Devolatilization is generally completed in one or more stages involving heating and exposing the viscous polymer solution stream to elevated temperatures and to reduced pressure, or vacuum, where the volatile components are vaporized and removed from the purified polymer. The degree of removal of the volatile components from the polymer product is typically greatly restricted by a combination of the high viscosity of the liquid polymer stream, and the general desire to reduce the duration of polymer exposure to the elevated temperatures that are required for effective devolatilization. These restrictions motivate producers of such polymers to employ a variety of devices to improve the distribution and exposure of viscous polymer streams to vacuum, thereby obtaining a final polymer product with minimum levels of volatile impurities.

The distribution and exposure of the viscous polymer liquid to vacuum is improved with two general types of liquid distribution devices. The first such distributor device relies on pressure generated in upstream equipment to force the viscous polymer liquid stream through a manifold and thence through a plurality of flow channels which may take a variety of shapes, the intent of which is to maximize the surface area of viscous liquid exposed to reduced pressure, and will be referred to herein as a "pressurized distributor." The second such distributor device relies on gravity to distribute the viscous stream over and/or through the distributor to form one or more streams or strands. This second device may be an open pipe discharge; or discharge over one or more flat or tilted plates, shaped plates, sieve plates or assemblies, slotted plates or assemblies; or a combination of the previously named plates or assemblies with weirs that serve to add residence time. These types of distributors are referred to herein as "gravity distributors."

Some manufacturers use only one heating step for all stages, while others use a heating step before each distribution and vacuum exposition stage. Additionally, the incorporation of a small fraction of a highly volatile stripping agent such as steam or methanol between stages is sometimes practiced.

Gordon et al., in U.S. Pat. No. 3,853,672 (Dec. 10, 1974), disclose an apparatus for an improved falling strand devolatilizer. The devolatilizer includes a shell and tube heat exchanger whose tubes discharge as falling strands into a first vessel operating under a level of vacuum provided by a gas pump attached to the first vessel. The first vessel is connected to a second, independent vessel that operates at a higher degree of vacuum, via an actuated valve that controls the flow from and level in the first vessel. Each vessel is designed and constructed as a separate vessel. The claims include a liquid pump to empty the second vessel, a level sensor in the first vessel, and a level controller. The claims are also limited to vessels with generally tapering lower regions terminating at a discharge port.

Hagberg, in U.S. Pat. No. 3,928,300 (Dec. 23, 1975), discloses a process for devolatilizing polystyrene in essentially the same device disclosed by the Gordon patent above. Hagberg claims a process for devolatilizing styrene homopolymer that minimizes the oligomer content in said styrene homopolymer by exposing the tubes of the shell and tube heat exchanger to various levels of vacuum in the first vessel, and passing the polymer solution by gravity and differential pressure to the second vessel that operates at a fixed, higher level of vacuum. Hagberg shows a reduction of styrene oligomer content in the product from 1.7% to 1.2% by adjusting the first vessel pressure from 760 to 50 mm Hg absolute.

Hagberg, in U.S. Pat. No. 3,966,538 (Jan. 29, 1976), discloses the apparatus for the Hagberg patent above (which is essentially the same as the Gordon patent), differing only in modifying the method of attachment of the heat exchanger to insert the discharge tubesheet into the first vessel. The patent also claims the embodiment of this heat exchanger and vessel combination where the second vacuum vessel is not used.

These three aforementioned patents have in common a design whereby the viscous liquid enters the first vacuum vessel through a heat exchanger whose tubes discharge the liquid directly into the first vessel as partially devolatilized falling strands. Further, the liquid passes from the first vessel by gravity and differential pressure through a valve into a second vacuum vessel, which is maintained at a higher vacuum relative to the first vessel.

Newman, in U.S. Pat. No. 4,294,652 (Oct. 13, 1981), discloses an improvement to the apparatus of the above-described Gordon and Hagberg patents. In particular, the second vacuum vessel is partitioned into two compartments with a means of circulating viscous liquid from one side to the other. A baffle is used to divert the flow to one compartment, and a weir is used to separate the tank bottom into two compartments of substantially equal size. The circulated material may be transferred through an orifice to increase the surface area of the falling viscous liquid during devolatilization. The main objective of this patent is to modify the apparatus and process of Gordon and Hagberg to allow the incorporation of steam as a stripping agent to the second vacuum vessel.

McCurdy et al., in U.S. Pat. No. 4,439,601 (Mar. 27, 1984), disclose a multistage devolatilization apparatus that comprises a heater followed by two vacuum vessels operating at less than atmospheric pressure. The second vessel operates at a pressure below the first vessel. The vaporized volatile components that are removed from the second vacuum vessel are recombined with the vaporized volatile components from the first vacuum vessel. The arrangement of the heater and the first vacuum vessel is not specified. The method in which the material passes from the first vessel into the second vessel is not specified, and neither is the means for allowing the recombining of vapor from the first and second vessels. This apparatus can be operated with or without heating between the first and second vessels. The use of a third vacuum vessel is provisionally claimed. The main intent of the apparatus in the McCurdy patent is to allow condensation of all removed vapor by means of normal cooling water rather than by means of refrigerated water, thereby saving operational costs.

Ando et al., in U.S. Pat. No. 4,537,954 (Aug. 27, 1985), disclose a three-stage devolatilization process for removing volatile components. Each stage is specified as consisting of a vertical foaming preheater and one vacuum vessel. The third stage is operated at a pressure of 50 Torr or less in the presence of a highly volatile stripping agent, such as steam.

All of the above process and apparatus systems have drawbacks and limitations. In some cases, the limitations relate to the degree of devolatilization that can be accomplished. In other cases, the limitations relate to the kinds of liquid that can be effectively devolatilized with a specific system or piece of equipment. In each case, two or more separate vessels are required to serve as the vacuum devolatilizers, which leads to an expensive and bulky apparatus.

These and other difficulties experienced with the prior art systems have been obviated in a novel manner by the present invention.

The applicants conducted extensive research and investigations, including computer modeling and testing various sizes of the apparatus, towards improving the apparatus employed in a continuous unit operation, by the use of a single vessel to achieve equal or better devolatilization results than systems using two separate vessels.

It is, therefore, an outstanding object of the present invention to provide apparatus and methods that increase the degree of devolatilization of polymers achieved by the system.

Another object of this invention is to provide an apparatus and method that reduce the equipment space required to effectively devolatilize a liquid stream.

Another object of this invention is to provide an apparatus that is less expensive to build than previous systems.

Another object of the present invention is to provide apparatus and methods that increase the range of kinds and physical properties of liquid streams that the system can effectively devolatilize.

Another object of the invention is to provide an apparatus and method for retrofitting existing equipment or systems to increase the removal of volatile compounds from polymers.

Another object of the invention to provide a devolatilization system that is less expensive to operate and maintain than previous systems.

With these and other objects in view, as will be apparent to those skilled in the art, the invention resides in the combination of parts set forth in the specification and covered by the claims appended hereto, it being understood that changes in the precise embodiment of the invention herein disclosed may be made within the scope of what is claimed without departing from the spirit of the invention.

SUMMARY OF THE INVENTION

An embodiment of the present invention relates to a devolatilizer system that utilizes a single vessel to contain two separate vacuum chambers, achieving multiple stages of devolatilization in the single vessel. The present invention enables manufacturers of the aforementioned polymers to produce polymers with lower levels of residual volatile components than with previous two-vessel systems, in a smaller space, and at less cost to install, operate, and maintain than two-vessel systems. The present invention also lends itself to relatively easy retrofits of existing production units, and may be adapted for use with a variety of polymer products.

BRIEF DESCRIPTION OF THE DRAWINGS

The character of the invention, however, may best be understood by reference to one of its structural forms, as illustrated by the accompanying drawings, in which.

DETAILED DESCRIPTION OF THE PREFERRED EMBODIMENT

Figure 1:
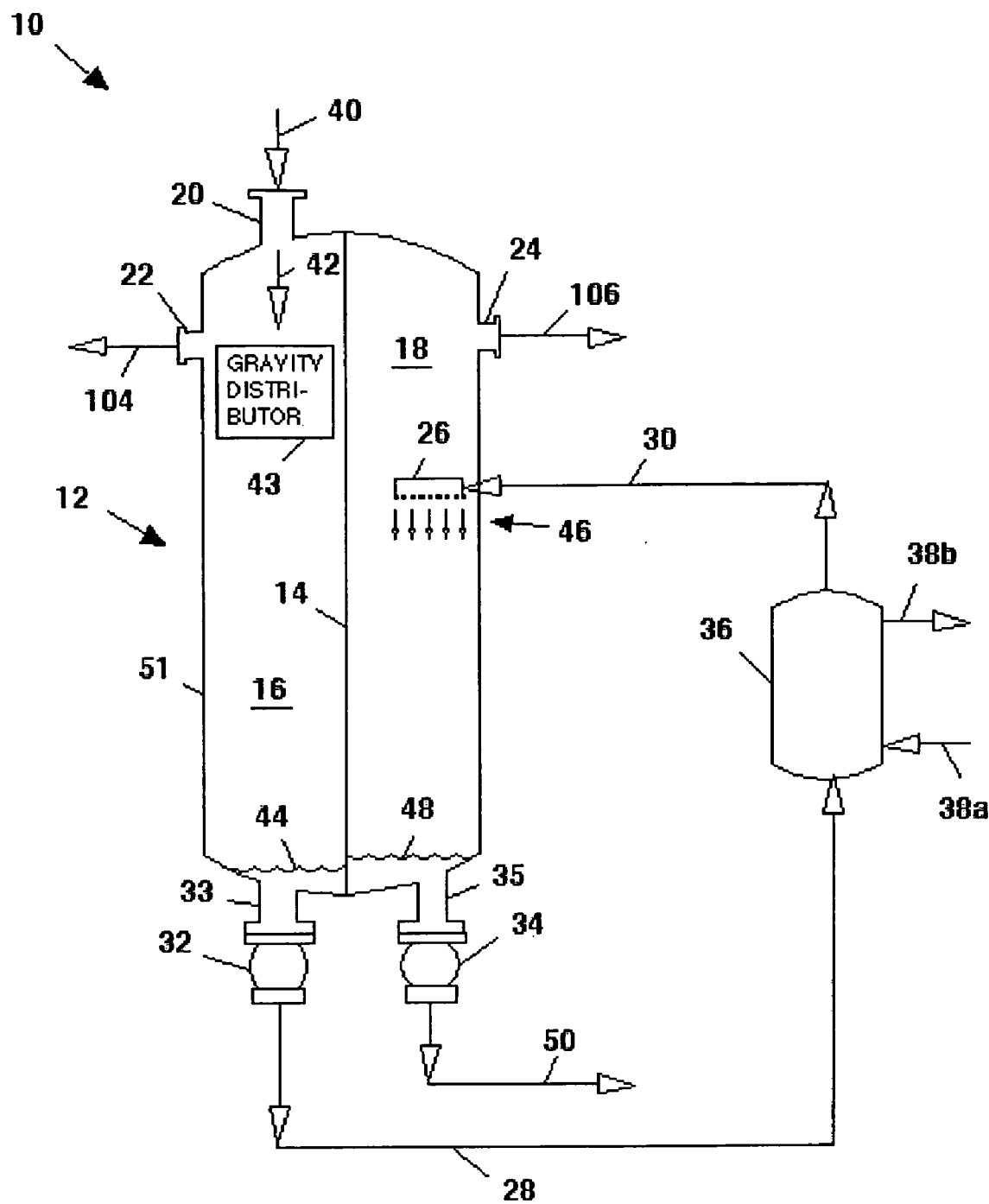
FIG. 1 is a side elevation view in partial schematic and diagrammatic form of a devolatilizer system according to one embodiment of the present invention.

An embodiment of the present invention relates to a devolatilizer system or apparatus for removing volatile components from viscous polymer liquids. The apparatus includes a vessel divided into two major chambers by a baffle that separates the first chamber from the second chamber so that each chamber is able to maintain a different level of vacuum, either in conjunction with the presence of viscous polymer liquid or not. (As used herein, the term "vacuum" refers to very low pressures generally.) A feed stream of viscous polymer liquid containing volatile components enters the upper section of the first chamber of the vessel. The stream is exposed to a level of vacuum while being directed to the entrance of a pump at the bottom of the first chamber and vessel. The liquid is transferred through a circulation pipe to an upper portion or region of the second chamber. A manifold system, containing a number of flow channels, evenly distributes and directs the re-circulated viscous polymer liquid as strands to the bottom of the second chamber, thereby exposing the strands to a higher level of vacuum than in the first chamber. In other words, as the liquid passes into the manifold it is directed through the flow channels, which divide the liquid into a number of strands that pass downwards through the second chamber. The volatile components are vaporized and withdrawn through vapor takeoff ports towards the vacuum source. The remaining purified polymer product is pumped from the second chamber to be further processed, which may include filtering, stranding, spinning, cooling, the addition of further components, forming into pellets, or other processing steps used to prepare a product in final form.

According to an additional embodiment of the present invention, the baffle that separates the two chambers is formed so that the first chamber is above the second chamber, e.g., the baffle is generally horizontally disposed across the vessel. An additional baffle or divider is used to separate the second chamber into two parts or collection areas. The two collection areas are open to the second chamber, meaning that both are exposed to the same level of vacuum in the second chamber. A valve, restriction orifice, or other restrictive nozzle is incorporated in the bottom of the first chamber (e.g., it is attached to the baffle), which allows a pool of fluid to form that completes the seal between the two major chambers, thereby allowing the second chamber to be maintained at a higher level of vacuum than the first chamber. The valve or other restrictive nozzle controls the rate of liquid polymer flow by gravity into the first collection area in the second chamber. A recirculation pump then directs liquid polymer flow to a stranding distributor manifold at the top of the same second chamber, which directs strands of liquid polymer to the second collection area in the second chamber and to a product discharge pump. In this way a third devolatilization stage is added to the single vessel, where the second and third stages both occur in the second chamber.

The devolatilizer apparatus may receive its viscous liquid feed by a variety of methods, including by gravity and differential pressure from a previous reactor or vessel, from a discharge pipe from a previous reactor or vessel, or from a heat exchanger mounted on or above or beside the apparatus. The viscous liquid feed may be distributed on or through either a pressurized distributor or a gravity distributor. It may be advantageous to receive the viscous liquid feed at an elevated temperature, so that the volatile components will vaporize in the apparatus, thereby separating from the viscous polymer liquid. Additionally, some embodiments of the present invention incorporate a heat exchanger in the apparatus to add heat to the re-circulating viscous liquid stream.

FIG. 1 shows a devolatilizer system or apparatus 10 according to a first embodiment of the present invention. The apparatus 10 includes a vessel 12 having a fully sealed baffle 14 that divides the vessel 12 into distinct first and second chambers 16, 18. For example, the baffle 14 may extend from the top to the bottom of the vessel 12, longitudinally dividing the vessel into the two chambers 16, 18. In other words, the vessel 12 has a longitudinal axis, generally corresponding to the line of the baffle 14 shown in FIG. 1, with the baffle 14 lying on or parallel to the longitudinal axis. Optionally, the baffle may generally bisect the vessel interior, that is, generally evenly divide the interior into the two chambers. (By "generally," it is meant that neither chamber occupies more than 75% of the total interior volume.) A viscous polymer liquid feed nozzle 20 (e.g., a first nozzle) is provided in the top of the vessel 12 for entry of the viscous polymer liquid into the first chamber 16. (The term "nozzle" refers to openings for fluid passage generally, including apertures, orifices, valves, and the like.) Vapor outlet nozzles 22, 24, cooperative with the first and second chambers 16, 18, respectively, are provided for removing the volatile compounds vaporized by exposing the viscous polymer liquid to the vacuums in the first and second chambers. A viscous polymer liquid manifold and stranding distributor 26 ("manifold assembly") is disposed in the upper region of the second chamber 18 for discharging the viscous polymer liquid as a plurality of strands 46 for passage through the second chamber. The apparatus 10 also includes: viscous polymer liquid recirculation lines 28, 30; a re-circulation pumping device 32 and second nozzle 33; a discharge pumping device 34 and discharge nozzle 35; and an optional circulation heater 36 with a heating media inlet 38a and a heating media outlet 38b.

In operation, a viscous polymer liquid stream 40, containing some portion of volatile components, enters the first chamber 16 of the vacuum vessel 12 via the viscous polymer liquid feed nozzle 20 from upstream equipment such as a reactor pump, a previous devolatilizer, a viscous liquid heater, or the like. Falling through the first chamber 16 under changed conditions (e.g., low pressure or vacuum), the viscous polymer liquid stream 42 may interact with (e.g., pass over, on, or through) a gravity distributor 43 to assist in further reducing the concentration of residual volatile components remaining in the polymer liquid. The stream 42 falls to the bottom of the chamber 16 and forms a pool of partially devolatilized viscous polymer liquid 44 above the entrance of the second nozzle 33 and re-circulation pump 32, which are located at the bottom of the first chamber 16. (As should be appreciated, each nozzle 20, 33, 35 is a restricted opening in the vessel 28 for controlled passage of the viscous polymer liquid into or out of the vessel.) The liquid is pumped through circulation lines 28, 30, optionally through the heater 36, and to the manifold assembly 26 in the second chamber 18. The manifold assembly 26 divides the viscous polymer liquid into a number of separate streams or strands 46 that fall by gravity through the second chamber 18 to form a pool 48 above the discharge nozzle 35 and entrance to the discharge pump 34 as nearly fully devolatilized polymer. The discharge pump 34 removes the nearly fully devolatilized polymer from the vessel 12 as polymer product 50.

As should be appreciated, the devolatilizer apparatus 10 shown in FIG. 1 uses a single vessel 12 to achieve two separate stages of vacuum devolatilization, whereby volatile components are partly removed from the viscous polymer liquid stream in the first chamber 16, and then further removed as the polymer falls in strands from the manifold assembly 26 in the second chamber 18. By "single" vessel, it is not meant to preclude the possibility of other vessels upstream or downstream of the vessel 12 (e.g., for storage purposes, or for carrying out additional processing steps), but rather that both chambers 16, 18, each capable of holding a different level of vacuum, are contained within the same vessel, that is, within the confines of a common outer sidewall or sidewalls 51 (including top and bottom sidewalls). The outer sidewall(s) 51 defines a unitary interior, which is divided by the baffle 14 to form the chambers 16, 18. Typically, the baffle 14 will not form part of the outer sidewall(s) 51. By "unitary" interior, it is meant that the vessel's outer sidewall(s) 51 define an interior space wherein but for the presence of the baffle there would be unrestricted flow of viscous polymer liquid between the two areas of the interior space that make up the chambers when the baffle is in place. The outer sidewall 51 may be integrally formed, by which it is meant that all portions of the sidewall are permanently attached to one another. For example, an integral sidewall may be machined or otherwise manufactured from a single piece of material (e.g., metal plating), or by permanently attaching a plurality of material pieces/portions to one another via welding or the like. This does not preclude the use of the nozzles 20, 22, 24, etc. for ingress and egress of the viscous polymer liquid through the sidewall, or the presence of ports, hatches, or the like in the sidewall for accessing the interior, which would be closed using removable cover plates or the like.

Figure 2:
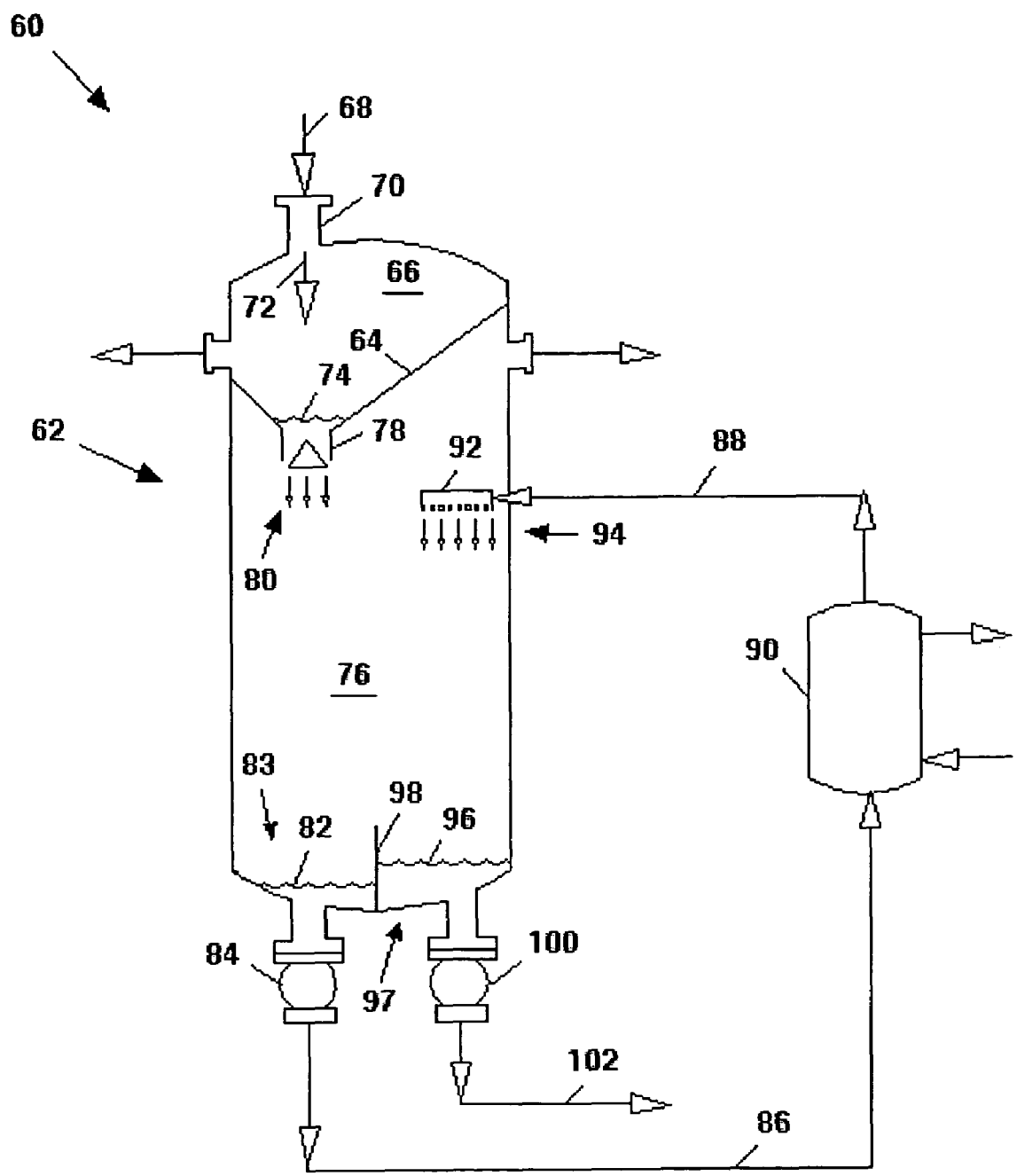
FIG. 2 is a side elevation view in partial schematic and diagrammatic form of another embodiment of the present invention.

According to an additional embodiment of the present invention, a third stage of devolatilization can be added to a single vessel. FIG. 2 shows a devolatilizer apparatus 60 utilizing a single vessel 62. The apparatus 60 is generally similar to the apparatus 10 shown in FIG. 1, except that a fully sealed section baffle 64 is formed or positioned so that a first vacuum chamber 66 occupies the top of the vessel 62 and a second chamber 76 occupies the bottom of the vessel 62. In particular, the baffle 64 laterally divides the vessel interior into the chambers 66, 76, with the first chamber 66 lying generally above the second chamber 76. (By "generally" above, it is meant that the first chamber lies above at least a portion of the second chamber such that when the viscous polymer liquid flows from the first chamber to the second chamber under action of gravity it passes down through the second chamber for exposure to the vacuum in the second chamber and collection at the bottom of the second chamber.)

In this embodiment, a viscous polymer liquid stream 68, containing some portion of volatile components, enters the first chamber 66 of the vacuum vessel 62 via feed nozzle 70 from upstream equipment such as a reactor pump, a previous devalitizer, and/or a viscous liquid heater. The polymer liquid 72 falls to the hydraulic bottom of the first chamber 66 to form a pool 74 that seals the first chamber 66 from the second, lower chamber 76. The hydraulic bottom of the first chamber 66 has a restrictive opening/nozzle 78 that allows the partially devolatilized polymer liquid to flow from the pool 74 in the first chamber 66 to the second chamber 76 at a controlled rate. Upon entering the second chamber 76, the liquid 80 falls from the restrictive opening/nozzle 78 by gravity, either directly or over or through a device that restricts or controls the direction of flow or the rate of passage, to form a first pool 82 in a first collection area 83 at the bottom of the second chamber 76. The pool 82 contains further devolatilized polymer liquid above a polymer liquid recirculation pump 84, which pumps the liquid through circulation pipes 86, 88, optionally through a heater 90, and to a manifold assembly 92. The manifold assembly 92 divides the viscous polymer liquid into a number of strands 94 that fall by gravity to form a second pool 96 in a second collection area 97 at the bottom of the second chamber 76. A bottom baffle or divider 98 separates the two pools 82, 96 from one another, i.e., the divider 98 partitions the bottom of the second chamber 76 into the two collection areas 83, 97. The liquid in the second pool 96 lies above the entrance to a pump 100 as nearly fully devolatilized polymer that the pump 100 discharges as product 102. The second pool 96 contains a quantity of nearly fully devolatilized polymer liquid that is maintained separate from the first pool 82 by the baffle 98.

The devolatilizer apparatus 60 in FIG. 2 incorporates three devolatilization stages in the single vessel 62. In particular, the first devolatilization stage is achieved in the first vacuum chamber 66 at the top of the vessel 62. The second devolatilization stage is achieved as the polymer liquid falls through the second vacuum chamber 76 to the pool 82 and the polymer circulation pump 84. The third devolatilization stage occurs as the polymer liquid falls in strands from the manifold assembly 92 in the second chamber 76, to the second pool 96 and pump 100.

Referring to FIG. 1, volatile components are vaporized from the stream 42 and removed from the first chamber 16 through the discharge nozzle 22 as a stream 104 in vapor form. Volatile components are vaporized from the stream/strands 46 in the second chamber 18, and removed from the second chamber 18 through the discharge nozzle 24 as a stream 106 in vapor form. The streams 104, 106 flow to downstream equipment such as a condenser(s), a partial condenser(s), and/or vacuum equipment. Volatile components are removed from the apparatus 60 in FIG. 2 in a similar manner, except that volatile components are vaporized from both the stream 80 and the stream/strands 94 in the second chamber 76.

The stream 42 passing down through the first chamber 16 in FIG. 1 may fall as a single stream or as a plurality of streams/strands. Additionally, the stream 80 passing down through the second chamber 76 in FIG. 2 may fall as a single stream or as a plurality of streams/strands.

Those skilled in the art will appreciate that all of the equipment depicted in FIGS. 1 and 2 of necessity must include means for heating and insulating so as to maintain the desired viscosity of the viscous liquid. Such heating can be by means of integral fluid heating jackets, half pipe coils, external clamp-on fluid heat jackets, electrical heating, or the like. Further, those skilled in the art will recognize that the baffle 14 can be of various shapes and dimensions so long as the baffle acts to properly separate the first vacuum chamber from the second chamber and allow polymer liquid to collect in pools and be pumped by circulation pump 32 and product pump 34. Those skilled in the art will also recognize that the number of pumping devices may vary from the number shown for both the first chamber 16, 66 and the second chamber 18, 76.

Either or both chambers may be outfitted with a gravity distributor for enhancing the removal of volatile components from the viscous polymer liquid interacting with the distributor. Suitable gravity distributors include flat plate gravity distributors, tilted plate gravity distributors, formed plate gravity distributors, sieve gravity distributors, and slot gravity distributors.

EXAMPLE 1

In a commercial production unit, an apparatus similar to that as illustrated in FIG. 1 was installed to replace a single-stage devolatilization apparatus that had heretofore devolatilized polystyrene liquid to obtain a final solid polystyrene product with typical levels of residual styrene monomer of 0.12% to 0.3%. Viscous polystyrene liquid containing volatile components such as un-reacted styrene monomer, impurities from the styrene monomer feedstock to the production plant, and polymerization byproducts, was pumped to the new apparatus similar to that in FIG. 1, from a reactor pump and viscous polymer fluid heat exchanger, at 3300 pounds per hour and at 230° C. The first vacuum chamber was maintained at 15 mm Hg absolute pressure, and partially devolatilized polystyrene liquid was pumped from the first chamber to the second vacuum chamber that was maintained at 1.4 mm Hg absolute pressure and 230° C. The level of residual styrene in the final product that was collected after discharge from said vessel was measured at 0.013%. The final polystyrene product had a melt flow index of 4.6, which was within the manufacturer's quality specification.

As should be appreciated, minor changes may be made in the form and construction of the invention without departing from the material spirit thereof. It is not, however, desired to confine the invention to the exact form herein shown and described, but it is desired to include all such as properly come within the scope claimed.

What is claimed is:
1. An apparatus for devolatilizing a viscous polymer liquid containing volatile components, said apparatus comprising:
   a single vessel having at least one outer sidewall, a unitary interior, and at least one baffle that separates the unitary interior into first and second chambers maintainable at different levels of vacuum;
   a first nozzle attached to the vessel for entry of the viscous polymer liquid into an upper region of the first chamber, wherein the viscous polymer liquid is exposed to the vacuum in first chamber as the viscous polymer liquid passes through the first chamber for collection at a bottom of the first chamber;
   a second nozzle attached to the vessel for conveyance of the viscous polymer liquid from the bottom of the first chamber to an upper region of the second chamber;
   a manifold assembly located in the upper region of the second chamber, wherein the manifold assembly is configured to discharge the viscous polymer liquid for passage through the second chamber and collection at a bottom of the second chamber, said viscous polymer liquid being exposed to the vacuum in the second chamber;
   a discharge nozzle attached to the vessel for removal of the viscous polymer liquid collecting at the bottom of the second chamber;

wherein the at least one baffle laterally divides the unitary interior of the vessel into said first and second chambers, said first chamber lying generally above said second chamber;

wherein the second nozzle is connected to the at least one baffle for passage of the viscous polymer liquid from the first chamber to the second chamber;

wherein the second nozzle is located at the bottom of said first chamber for flow of the viscous polymer liquid from the first chamber to the upper region of the second chamber, said viscous polymer liquid passing down through the second chamber and collecting at the bottom of the second chamber; and wherein the second nozzle is configured to restrict the flow of said viscous polymer liquid from the first chamber to the second chamber for formation of a pool of said viscous polymer liquid above the second nozzle, thereby sealing the first chamber from the second chamber for maintenance of different levels of vacuum in the first and second chambers.

2. The apparatus of claim 1 further comprising:

a third nozzle connected to the vessel for conveyance of the viscous polymer liquid collecting at the bottom of the second chamber to the manifold assembly, wherein the bottom of the second chamber is divided into first and second collection areas by a bottom divider, the viscous polymer liquid discharged from the second nozzle being collected in the first collection area and the viscous polymer liquid discharged by the manifold assembly being collected in the second collection area for removal by the discharge nozzle.

3. The apparatus of claim 1 further comprising:

at least one gravity distributor disposed in at least one of the first chamber and the second chamber, wherein the viscous polymer liquid passing through said at least one of the first chamber and the second chamber interacts with said at least one gravity distributor to enhance the removal of volatile components, each of said at least one gravity distributor being selected from the group consisting of a flat plate gravity distributor, a tilted plate gravity distributor, a formed plate gravity distributor, a sieve gravity distributor, and a slot gravity distributors.

4. The apparatus of claim 1 further comprising:

a heat exchanger connected to the manifold assembly for changing the temperature of the viscous polymer liquid prior to its discharge by the manifold assembly, for enhancing the removal of volatile components from the viscous polymer liquid subsequent to discharge by the manifold assembly and passage through the second chamber.

* * * * *